United States Patent [19]

Wirtz et al.

[11] 3,900,225

[45] Aug. 19, 1975

[54] FITTING FOR A SEAT HAVING A SEAT ELEMENT AND A TILTABLE BACKREST ELEMENT

[75] Inventors: Egon Wirtz, Remscheid-Lennep; Paul Werner, Remscheid, both of Germany

[73] Assignee: Fritz Keiper, Remscheid-Hasten, Germany

[22] Filed: Feb. 6, 1974

[21] Appl. No.: 440,036

[30] Foreign Application Priority Data

Feb. 9, 1973  Germany.................... 2306312

[52] U.S. Cl. .................. 297/367; 16/146; 297/354
[51] Int. Cl. .............................................. B60n 1/06
[58] Field of Search .................. 297/366–372, 297/379, 354; 16/139, 145–147; 74/516, 518

[56] References Cited
UNITED STATES PATENTS

| | | | |
|---|---|---|---|
| 2,367,829 | 1/1945 | Shinn................ | 297/367 X |
| 3,259,433 | 7/1966 | Werner.............. | 297/379 X |
| 3,479,088 | 11/1969 | Bonnaud............ | 297/366 UX |
| 3,737,946 | 6/1973 | Giuliani............. | 297/367 X |

*Primary Examiner*—Roy D. Frazier
*Assistant Examiner*—William E. Lyddane
*Attorney, Agent, or Firm*—Michael S. Striker

[57] ABSTRACT

A first plate member of the fitting is connectable with the seat element, and a second plate member is connectable with the tiltable backrest element. A pivot connects the two members for relative pivotal displacement about a pivot axis. The second plate member is formed with an arcuate gear segment concentric with an arcuate ratchet segment the centers of curvature of which coincide with the axis, and a gear is turnably journalled on the first plate member and meshes with the gear segment. A pawl arrangement is pivoted on the first plate member and is responsive to rapid relative pivoting of the first and second members about the pivot axis thereof by engaging the ratchet segment in order to thereby block the further pivoting, while remaining out of engagement with the ratchet segment if the first and second members are pivoted relatively slowly about the pivot axis.

9 Claims, 1 Drawing Figure

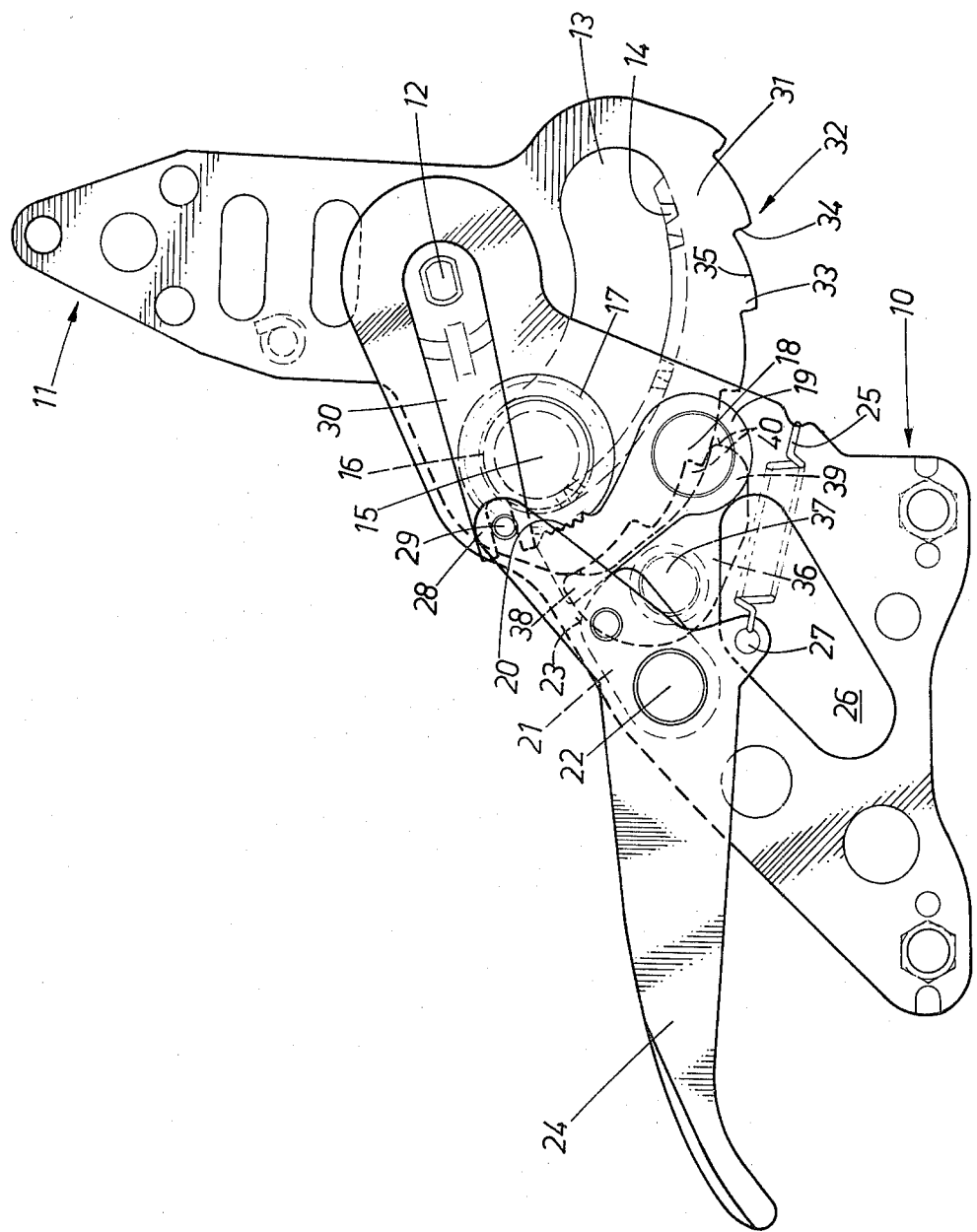

1

FITTING FOR A SEAT HAVING A SEAT ELEMENT AND A TILTABLE BACKREST ELEMENT

BACKGROUND OF THE INVENTION

The present invention relates generally to a fitting for a seat having a seat element and a tiltable backrest element, and more particularly, but not exclusively, to a fitting for a seat of this type which is used in vehicles, for instance automobiles.

The use of seats having tiltable backrests, which can be tilted backwards from a normal upright position to an inclined position or even to a substantially horizontal position, is becoming more and more prevalent in many applications, especially in automotive vehicles. These seats use fittings of which two pair are required, one at each end of the seat. Each of these fittings is composed of two plate members of which one is secured to the seat element itself and the other is secured to the tiltable backrest element. The plate members are pivotally connected with one another, and one plate member of each pair of fittings is formed with an arcuate gear segment whereas a turnably journalled gear provided on the other plate member meshes with the teeth of the arcuate gear segment. A blocking arrangement blocks the gear against rotation unless released, so that the plate member which is connected with the backrest element can be arrested in a selected position, that is in an upright or in one of the various inclined positions.

This type of seat is very much favored among purchasers of automotive vehicles. However, it is not without potential dangers, because a sudden—whether intentional or unintentional—release of the blocking arrangement and a consequent rapid tilting-back of the backrest element will startle the inhabitant of the seat and deprive him of proper body support. While this may be merely unpleasant in the case of a passenger, it can have potentially disastrous consequences in the case of the vehicle operator, since it may evidently lead to accidents.

The prior art has attempted to provide an arrangement according to which a rapid tilting-back of the backrest element is to be prevented, so that the tilting must occur either comparatively slowly—thus affording the inhabitant of the seat time to take appropriate counter measures—or else will be automatically blocked after an initial rapid displacement through a part of the possible tilting angle has occurred. However, the prior-art proposals have various disadvantages, including the fact that they do not reliably prevent rapid tilting, that they are rather space consuming and that they are susceptible to damage.

SUMMARY OF THE INVENTION

Accordingly, it is a general object of the present invention to provide an improved fitting of the type under discussion, which will avoid the aforementioned disadvantages.

More particularly, it is an object of the present invention to provide such an improved fitting which will not only be free of the aforementioned disadvantages, but will reliably prevent any possibility of rapid downward tilting of the backrest.

An additional object of the invention is to provide such an improved fitting which is simpler in its construction than the solutions known from the prior art, and which requires less space for its installation.

A further object of the invention is to provide such a fitting which is capable of withstanding even very high stresses transmitted to it, and which will always function reliably irrespective of the condition of other components of a seat construction on which it may be installed.

In keeping with the above objects, and with others which will become apparent hereafter, one feature of the invention resides in a fitting for a seat having a seat element and a tiltable backrest element, particularly a vehicle seat. Briefly stated, the novel fitting comprises a first plate member connectable with one of the elements, and a second plate member connectable with the other of the elements. Pivot means connects the members for relative pivotal displacement about a pivot axis. An arcuate gear segment concentric with an arcuate ratchet segment both having centers of curvature which coincide with the axis, and at least one of these gear or ratchet segments is formed on the second plate member. A gear is turnably journalled on the first plate member and meshes with the gear segment. Pawl means is pivotably mounted on the first plate member and is responsive to rapid relative pivoting of the members about the pivot axis by engaging the ratchet segment to thereby block the further pivoting, while remaining out of engagement with the ratchet segment during slower relative pivoting of the members about the pivot axis.

The construction according to the present invention is significantly simpler than what is known from the prior art, and in particular avoids the use of a gear which was previously required in the prior-art constructions for the sole purpose of attempting to limit the speed of relative angular displacement of the members. This also has the advantage of reducing the space requirements of the novel fitting, and, of course, the fitting is more reliable in operation because of factors which will be described hereafter. One of the advantageous characteristics of the novel fitting is that the arrangement which can block the pivoting when the pivot speed is too high, is completely independent of the arrangement which locks the plate member associated with the backrest element in a selected angular position, so that even if this arrangement should not properly operate, the safety arrangement according to the present invention, which prevents rapid tilting, continues to operate.

It should be understood that a seat requires two fittings, one at each end of the seat. It is conceivable to use a single fitting according to the present invention, and to merely use a non-blockable conventional fitting at the other end of the seat. Preferably, however, two of the fittings according to the present invention will be utilized. These can be connected together in a manner which will be evident to those having conventional skill in the art, so that the fittings can both be operated in unison.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a side view of a fitting according to the present invention.

DESCRIPTION OF THE PREFERRED EMBODIMENTS

The Figure illustrates one embodiment of the invention which serves to connect a seat element and a tiltable backrest element of a seat, for instance a vehicle seat, to one another. The seat element and the backrest element have not been illustrated, since they and the manner in which the fitting is connected to them, are already well known from the art.

The novel fitting according to the invention will be seen to utilize two plate members, the plate member 10 and the plate member 11. In the illustrated embodiment it is assumed that the plate member 10 is to be connected with the seat element whereas the plate member 11 is to be connected with the backrest element. The members 10 and 11, which could be completely flat plate-shaped members but which may, for instance, have their marginal zones bent over so as to extend normal or substantially normal to the general plane of the respective member for reinforcing purposes, are connected to one another for turning movement about a pivot 12 which defines a pivot axis. Evidently, covers may be provided which cover the members 10 and 11 to provide an aesthetically pleasing appearance and protect the mechanism against the entry of contaminants. Such covers are well known in the art and must not, of course, interfere with the proper operation of the fitting. The members 10 and 11 are conventionally connected with their associated seat element and backrest element by means of screws or the like which have not been shown. It is advantageous if biasing springs or the like are provided which act upon either the backrest element or the associated plate member 11 and tend to urge the two into upright position, that is in counterclockwise direction in the drawing.

The plate member 11 has an upper portion located above the axis defined by the pivot 12, and a lower portion which is located beneath this axis. This lower portion is formed with an arcuately curved cutout 13 one edge portion of which, namely the one that is remote from the pivot axis defined by the pivot 12, is formed as a gear segment 14 which is similarly arcuately curved and has its center of curvature coinciding with the pivot axis defined by the pivot 12. A pin 15 is mounted on the member 10 and has turnably journalled on it a gear 16 and a coaxial gear 17 which is advantageously of somewhat larger diameter than the gear 16. The gears 16 and 17 are connected with one another so that they turn in unison. The teeth of the gear 16 engage those of the gear segment 14 and when the member 11 pivots about the pivot 12 with reference to the member 10, the gear 16 rolls along the gear segment 14 in engagement with the same. The exact degree to which the member 11 can tilt with respect to the member 10 is determined by the length of the cutout 13.

A further pin 18 is also mounted on the member 10 and carries a pivotable pawl 19 having a free end which is formed with several teeth 20. The pawl 19, which cooperates with the gear 17, is essentially controlled by a cam 21 having a contact face 23. The contact face 23 is curved eccentrically with reference to the pivot pin 22 which is mounted on the member 10 and on which the cam 21 is turnable. An arm 24 is a release member by means of which the blocking arrangement of the fitting can be released so that the member 11 can pivot with respect to the member 10. The arm 24 is rigidly connected with the cam 21 and is itself turnable about the pin 22. It is evident that the cam 21 could also be of one piece with the arm 24. A spring 25 is provided which has one end portion that engages in the region of a cutout 26 of the member 10 an eye 27 of the arm 24, and another end portion which may be hooked into a recess formed in an edge of the member 10, as illustrated. It is clear that the spring 25 biases the arm 24 in counterclockwise direction, thus assuring that normally the teeth 20 of the pawl 19 are urged into blocking engagement with the teeth of the gear 17 under the influence of the cam 21, so that turning of the gears 16 and 17 is thereby prevented until and unless a user grasps the arm 24 and pulls it upwardly (in the drawing) to effect a disengagement.

The drawing shows that the arm 24 is provided with a portion 28 which extends past the surface portion 23 of the cam 21 and is provided in turn with a pin 29 which extends into a slot of a lever 30. The lever 30 is turnably mounted on the pivot 12 and may be coupled in a non-illustrated manner (e.g., via a shaft or the like) with a corresponding lever of a second fitting of the same seat, so that the levers 30 of both fittings would turn in unison if the second fitting corresponds to the one that has been illustrated herein. This engagement or disengagement of the members 11 of both fittings would take place in unison.

A portion 31 of the member 11 is provided in its marginal zone—which is also curved in such a manner that its center of curvature coincides with the pivot axis of the pivot 12—with a ratchet segment 32 which may have relatively few ratchet teeth 33 each of which has a steep flank 34 and a more slightly inclined second flank 35. A double-armed pawl 36 is pivoted on a pin 37 carried by the member 10. At one arm it is formed with a rounded region 38, and the other arm 39 is formed with a portion 40. Because of the arrangement of the pawl 37, the weight of the arm 39 tends to permanently displace the pawl 36 about the pivot 37 in clockwise direction. It is possible to replace this action or to enhance it by an appropriately applied spring, although this should not ordinarily be necessary.

The arrangement here is such that when the teeth of the ratchet segment 32 move past the pawl 36, the latter continuously performs rocking motions about the pin 37, being displaced in counterclockwise direction each time one of the teeth 33 passes over the rounded end portion 38, and subsequently tending to return in clockwise direction under the influence of gravity.

When the pawl 19 is released after operating of the arm 24, the backrest element and the member 11 can be tilted slowly in clockwise direction. If this movement is indeed slow, the pawl 36 performs the aforementioned rocking motion. It is first displaced in counterclockwise direction in the manner described above, but before the end portion 40 can move into blocking engagement with one of the flanks 34 of a respective tooth 33, the pawl 36 will already have pivoted back in clockwise direction under the influence of gravity. Thus, the member 11 can be tilted towards the right in the drawing as far as desired, and in fact in far as the elongation of the cutout 13 permits.

If, however, the member 11 is intentionally or accidentally pivoted towards the right at a rapid pace, that is at high angular speed, then the reversal in the movement of the double-armed pawl 36 under the influence of gravity is not rapid enough to prevent engagement of a respective tooth flank 34 with the end portion 40. The result is that after a short but rapid displacement of the member 11 towards the right in the drawing, one of the tooth flanks 34 will move into blocking engagement of the end portion 40 of the pawl 36, which has the result of blocking further movement of the member 11 about the pivot 12 towards the right.

The operation of this arrangement is particularly reliable, because it operates fully automatically and because the influence of gravity is to all intents and purposes constant, so that reliability of operation is assured even under disadvantageous conditions. On the other hand, if, for instance, contamination of the journalling between the pawl 36 and the pin 37 should make free pivoting of the pawl 36 impossible, or if such free pivoting should become impossible for any other reason, then any and all pivoting movement of the member 11 about the pivot 12 is precluded. This is an important safety factor, and, of course, such a blockage can be overcome by making the pawl 36 again freely pivotable on the pin 37.

It is self-evident that modifications can be made in the illustrated embodiment without departing from the intent and scope of the invention. The various elements might be arranged differently from what has been shown, or if two of the fittings are provided on a single seat, the two pawls 19 of the two fittings must be connected for movement in unison by a separate shaft which is offset from the pivot axis defined by the two pivots 12 of the two fittings. The ratchet segment 32 might be provided on the member 10 instead of the member 11, and conversely, the pawl 36 could then be pivotably mounted on the member 11 instead of the member 10. The provisions in which the pawl 19 on the one hand, and the pawl 36 on the other hand, become effective, may be offset to facilitate release of the respective blocking action, if desired.

It will be understood that each of the elements described above, or two or more together, may also find a useful application in other types of constructions differing from the type described above.

While the invention has been illustrated and described as embodied in a fitting for seats having a tiltable backrest element, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims.

1. A fitting for a seat having a seat element and a tiltable backrest element, particularly for a vehicle seat, comprising a first plate member connectable with one of said elements; a second plate member connectable with the other of said elements; pivot means connecting said members for relative pivotal displacement about a pivot axis; an arcuate gear segment concentric with an arcuate ratchet segment on said second plate member, both said segments having centers of curvature which coincide with said axis; a gear; journalling means journalling said gear on said first plate member so that the teeth of said gear mesh with said gear segment; pawl means; having first and second ends operatively engageable with said ratchet segment, said second end being normally biased out of engagement with said ratchet segment and mounting means pivotably mounting said pawl means on said first plate member, the pawl means being freely rockable and wherein rapid relative pivoting of said members about said axis causes said first end of said pawl means to cam said second end into blocking engagement with said ratchet segment to prevent further relative pivoting, while during slower relative pivoting of said members about said pivot axis said second end is free to move out of blocking engagement with said ratchet segment.

2. A fitting as defined in claim 1 wherein at least one of said gear segment or said ratchet segment is formed on said second member.

3. A fitting as defined in claim 2, wherein said second member has two arms which are located at opposite sides of said pivot axis; and wherein both said gear segment and said ratchet segment are formed on one of said arms.

4. A fitting as defined in claim 3, wherein said second member is connectable with said backrest element.

5. A fitting as defined in claim 1, wherein said second member is connectable with said backrest element.

6. A fitting as defined in claim 1; and further comprising releasable blocking means associated with said gear for normally blocking relative pivotal displacement of said members.

7. A fitting as defined in claim 6; and further comprising releasing means for releasing said blocking means to permit relative pivotal displacement of said members.

8. A fitting as defined in claim 3, wherein said one arm is formed with an arcuate cutout bounded by an edge portion; and wherein said gear segment is formed in said edge portion bounding said cutout.

9. A fitting as defined in claim 8, wherein said one arm has a free edge portion extending along said edge portion of said cutout; and wherein said ratchet segment is formed in said free edge portion.

* * * * *